Patented Aug. 10, 1948

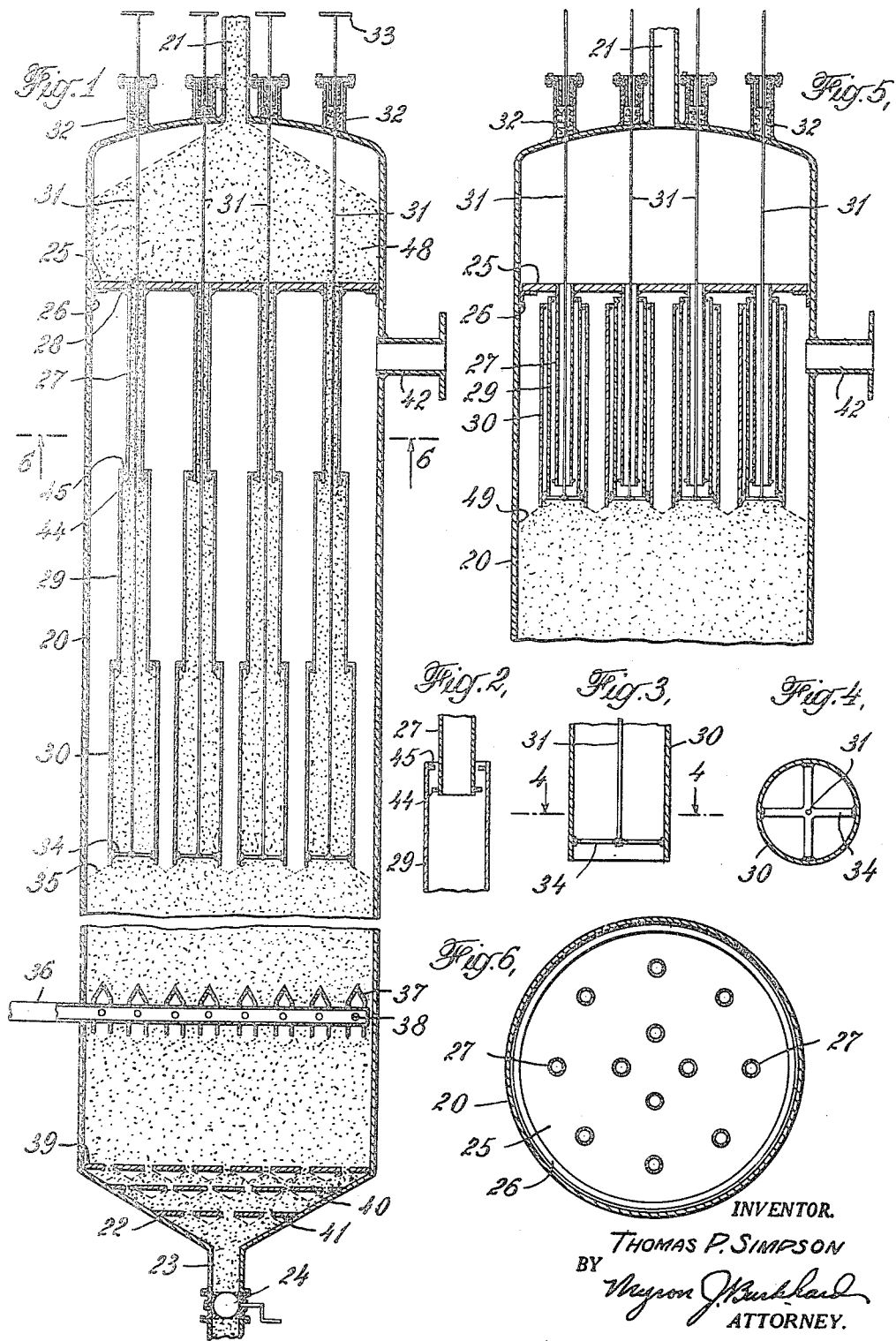

2,446,986

UNITED STATES PATENT OFFICE 2,446,986

APPARATUS FOR CONTACTING GASES WITH PARTICLE FORM SOLID MATERIAL

Thomas P. Simpson, Woodbury, N. J., assignor to Socony-Vacuum Oil Company, Incorporated, a corporation of New York Application April 8, 1944, Serial No. 530,221

2 Claims. (Cl. 23—288)

1

This invention has to do with apparatus for contacting gases with moving particle form solid material for any of a number of purposes such as gaseous conversion, solid treatment, adsorption, heat exchange and gas separation. Typical of such processes is the cracking conversion of hydrocarbons, it being well known that petroleum fractions, such as gas oil boiling between the ranges of about 500° F. to 800° F., when passed over a catalytic particle form contact mass material at temperatures of the order of 800° F. and upwards and pressures usually above atmospheric may be converted into gasoline, gas and other products.

The contact mass material may be used in pellet, granular or spherical form and may consist of natural or treated clay materials such as fuller's earth or Super-Filtrol or it may consist of synthetic combinations of alumina and silica, or silica, or silica and other metallic compounds with or without other added materials, such as certain metallic oxides.

In more recent developments of the art, processes involving the use of such materials for hydrocarbon conversion have involved systems wherein a catalytic material of particle form is passed cyclically through two zones. In the first zone the catalytic material is contacted with hydrocarbons for the purpose of conversion, and a certain amount of cokey material is deposited thereon. In the second zone this cokey material is burned off by the action of a combustion supporting gas, after which the catalytic material passes again to the first zone. This invention has particularly to do with reactors for use in processes of this nature.

In the control of reactions of this kind, there are several variables which must be given attention. An important variable of this nature is a space velocity, that is, the volume of oil (usually measured upon a liquid basis) which is passed through a unit volume of catalyst in a unit of time. For some reactions, a relatively high space velocity is desired. For other reactions, a relatively low space velocity is desired. Since heaters, fractionating equipment and the like usually operate best at a relatively uniform loading, it is frequently desirable to accomplish variations in space velocity, where required, by holding the oil thruput rate constant and varying the volume of contact mass material through which the reactants are passed. For example, in a reactor of a given cross section, assuming that it is handling reactants at a space velocity of 1, when they pass longitudinally from top to bottom of a contact

2 mass bed 10' deep, the space velocity may be doubled by reducing the height of the bed to 5'. This invention has to do with a reactor so equipped that beds of variable depths may be established and maintained in that reactor during a continuous operation. Since any one operation will utilize a bed of a particular depth for some period of time, the arrangements to vary the depth of bed need be suitable only for being changed at such intervals as it becomes necessary to change from one style of operation to another, however, it is desirable to be able to effect these changes in bed depth without opening, entering, or re-fitting of the reactor.

It is therefore a major object of this invention to provide a reactor in which adjustments may be made so that any one of several depths of bed may be provided without intervening refitting of or entry to the interior of the reactor.

This invention may be readily understood by reference to the drawings attached hereto, all of which are in diagram form, and which show a form of apparatus embodying this invention. In these drawings, Figure 1 is a partial view of the interior of a reactor, fitted in accordance with this invention. Figure 2 is a view, partially in section of an apparatus detail connected with Figure 1. Figure 3 is a similar view of another apparatus detail in connection with Figure 1. Figure 4 is a sectional plan view taken along the line 4—4 of Figure 3. Figure 5 is an elevational view, partially in section, showing the upper end of the reactor of Figure 1 and a second positioning of the solid material feed pipes therein, and Figure 6 is a sectional plan view taken at line 6—6 in Figure 1.

Turning now to Figure 1, we find that 20 is the shell of a reactor into which particle form contact material is fed through pipe 21, collecting in a storage space 48, defined by partition 25. Dependent from partition 25 into the body of the reactor are the several feed pipes 27, below which are pipes 29 and 30 of successively larger diameter. The pipes 27, 29 and 30 are of such different diameter as to permit free vertical movement thereof concentrically past each other. Stops such as 44 and 45 are provided at the ends of the pipes to prevent the passage of the upper end of any pipe below the lower end of the pipe of smaller diameter thereabove. Figure 2 presents a detailed view of such stops 44 and 45 on the ends of pipes 27 and 29, respectively. Extending vertically through the top of the reactor and through the pipes 27, 29 and 30 are the rods 31 which are connected to the lower ends of the pipes 30 through braces 34. Details of this connection are shown in Figure 3, which is a sectional view of the lower end of pipe 30 and Figure 4 which is a plan view thereof. In these figures the rod 31 is shown connected to the bar braces 34 which are in turn connected to the inside periphery of the pipe 30.

Returning again to Figure 1, it will be seen that the rods 31 pass through stuffing boxes 32 on top of the reactor and have handles 33 by which they may be manually moved upwardly and downwardly. Thus by pulling the rods 31 upwardly, the pipes 30 may be made to telescope around the pipes 29 thereby changing the level of contact material discharge within the reactor. By further upward movement of the rod 31, the pipes 30 and 29 may be made to telescope around pipe 27, thereby raising still further the level of contact material discharge. Thus by simple adjustment of the rods 31 and by proper control of the rate of contact material flow from the reactor, the level of the contact mass material may be selectively varied over a range of elevations along the length of the reactor. It will be understood that means other than that shown may be provided for pulling the rods 31 upward. For example, vertical racks having gear teeth therein may be attached to the upper ends of the rods 31 and manually or power driven gears meshing with said racks may be provided for moving the rods 31 upwardly or downwardly.

Provided upon the lower end of the reactor is the conical drain section 22 from which depends the contact material drain conduit 23 with flow throttle valve 24 thereon. Within the conical drain section are provided a series of horizontal partitions 39, 40 and 41 which have orifices therein so arranged as to withdraw contact material uniformly in a plurality of small streams from orifices evenly distributed with respect to the cross sectional area of the reactor and which successively re-combine these streams into a smaller number of streams and finally into a single outlet stream flowing through pipe 23. These partitions thereby serve to provide uniform downward flow of contact material throughout the entire reactor cross sectional area thereabove. Near the bottom of the reactor there is shown a reactant handling grid composed of pipe 36 mounted transversely of the reactor with which there are associated several gable roofed, open bottomed, trough members 37, which extend transversely of the reactor in a direction perpendicular to the plane of the drawing. Under each trough 37, there is an orifice 38, establishing communication between the interior of pipe 36 and space under trough 24. Near the top of the reactor and below the partition 25 is the gas passage conduit 42.

In operation the rods 31 are adjusted so as to permit contact material fed through pipe 21 to be discharged from the lower end of the telescopic feed pipe arrangement at the desired level within the reaction zone, such as level 35. This level is determined from the desired ratio of total oil throughput rate to volume of contact material within the reaction zone. The flow of contact material from the bottom of the reactor through pipe 23 is so throttled by valve 23 as to maintain the reactor substantially filled with a substantially compact column of particle form contact material up to the level of discharge from pipes 30. Gaseous hydrocarbons at proper operating conditions enter through conduit 36 and troughs 37 and pass upwardly through the column of contact material in the reactor. The gaseous reaction products disengage from the contact material at the surface 35 and pass from the reactor through conduit 42 and are fractionated and condensed in outside equipment (not shown). If desired, the direction of gas flow may be reversed so that the reactants enter through conduit 42 and are withdrawn through grids 37 and conduit 36. It will, of course, be understood that the invention is applicable to reactors in which other forms of gaseous inlet and outlet arrangements are used. Moreover, with proper distributor and collector arrangements transverse flow of gases may be provided. If it is desired to decrease the hydrocarbon space velocity, this may easily be accomplished without change in hydrocarbon throughput and without the upsetting of the hydrocarbon preparation and product fractionation equipment that would usually occur, by merely raising the rods 31 so as to telescope the pipes 27, 29 and 30 to such a degree as to permit the reactor to fill with contact material to the desired level. This changeover may be accomplished either by temporarily by-passing hydrocarbons from the reactor while the contact material level is being effectuated, or if done gradually, the feed pipes may be telescoped without interruption of hydrocarbon flow to the reactor. The advantages of such an apparatus over one requiring complete shutdown and entrance into the reactor in order to change the length of feed pipes is readily apparent.

Figure 5 is a diagrammatic view, partially in section, showing the position of the pipes 27, 29, 30 within the upper end of the same reactor when fully telescoped. This setting would provide the highest possible contact material level 49 within the reactor for this particular arrangement.

The number of feed pipes used is to a great extent dependent upon the diameter of the reactor used, but in any case, the pipes preferably should be uniformly spaced. Figure 6 is a plan view taken at 6—6 in Figure 1 showing the reactor shell 20, the partition 25 and the spacing of the pipes 27. Although the reactor shown is of circular cross section, the invention is equally applicable to reactors of other cross sectional shape.

The invention is not necessarily limited to the use of three pipes in each telescopic feed arrangement. The use of only two pipes, such as 27 and 29, would provide sufficient range of level control for many operations. The use of more than three pipes would provide a greater range of level control. It is not altogether necessary that all the pipes be of equal length but generally better flexibility of control will be obtained if they are all of substantially equal length. The lengths of the pipes are generally a matter of practical consideration depending upon the overall length of the reactor and the total range of space velocities, which possibly may be used in the particular process involved.

It will be understood that the invention is applicable to processes involving contact of gases with moving particle form solid material other than that of hydrocarbon conversion and that the process of application and the details of construction of the invention given hereinabove are intended to be merely exemplary in character and are in no way intended to limit the scope of this invention except as it is limited in the following claims.

I claim:

1. In an apparatus of the type described for conversion of fluid hydrocarbons in the presence of a particle-form contact material, a closed vertical vessel, a partition within the upper end of said vessel extending horizontally thereacross forming thereabove a closed surge chamber for particle-form solid material; conduit means to admit said solid material to said chamber through the top of said vessel; a plurality of uniformly spaced telescopic arrangements depending from said partition, each one of said telescopic arrangements comprising a plurality of open end pipes of substantially equal length and different diameters of which the pipes of smallest diameter is dependent from said partition and of which the remaining pipes are of progressively increasing diameter with their downward position when said arrangement is extended, the total vertical length of any one of said telescopic arrangements when fully extended amounting to at least one half of the length of said vessel; means connected to the lower ends of the pipes of largest diameter in each of said arrangements and extending upwards through all the pipes therein and through the top of said vessel to permit vertically extending and contracting each of said telescopic arrangements from points outside said vessel, thereby permitting selective introduction of said solid material to any of a number of vertical locations along a major portion of the length of said vessel; overlapping stop members near the end of each pipe to limit the downward extension of said telescopic arrangements so as to prevent the upper end of each pipe from passing below the lower end of the pipe of next smaller diameter; outlet conduit means on the bottom of said vessel for solid material withdrawal, flow throttle means upon said outlet conduit; reactant gas inlet means near one end of said vessel and reactant product outlet means near the opposite end thereof.

2. A reactor for converting hydrocarbon fluids in the presence of a moving particle-form solid contact mass material comprising: a closed, vertical vessel; a partition within the upper section of said vessel extending horizontally thereacross so as to provide a closed surge chamber for solid material in the upper portion of said vessel and therebelow a closed reaction chamber; fluid hydrocarbon reactant inlet means near one end of said reaction chamber; fluid reactant outlet means near the opposite end of said reaction chamber; outlet conduit means on the bottom of said vessel for solid material withdrawal; flow throttle means on said outlet conduit means; baffle means within the lower section of said vessel above said outlet conduit means adapted to insure uniform flow of contact material from all portions of the horizontal cross-sectional area of said vessel to said outlet conduit means; means to introduce contact material to said surge chamber; at least one vertically extending telescopic arrangement of open end conduits depending downwardly from said partition for solid flow from said surge chamber to said reaction chamber; externally controllable means for vertically extending and contracting said telescopic arrangement; said telescopic arrangement being adapted to provide a difference between contracted and fully extended vertical lengths which extends through at least half the vertical distance between said fluid reactant inlet means and said fluid reactant outlet means; and stop members fastened near the ends of said conduits in said telescopic arrangement of conduits adapted to prevent the vertical separation of the ends of said conduits during the extension of said telescopic arrangement of conduits.

THOMAS P. SIMPSON.

REFERENCES CITED

The following references are of record in the file of this patent:

UNITED STATES PATENTS

| Number | Name | Date |
| --- | --- | --- |
| 669,441 | Guiterman | Mar. 5, 1901 |
| 1,021,757 | Blaisdell | Apr. 2, 1912 |
| 1,102,714 | Bornmann | July 7, 1914 |
| 2,353,505 | Scheineman | July 11, 1944 |
| 2,418,672 | Sinclair et al. | Apr. 8, 1947 |

FOREIGN PATENTS

| Number | Country | Date |
| --- | --- | --- |
| 383,616 | Great Britain | 1932 |